UNITED STATES PATENT OFFICE.

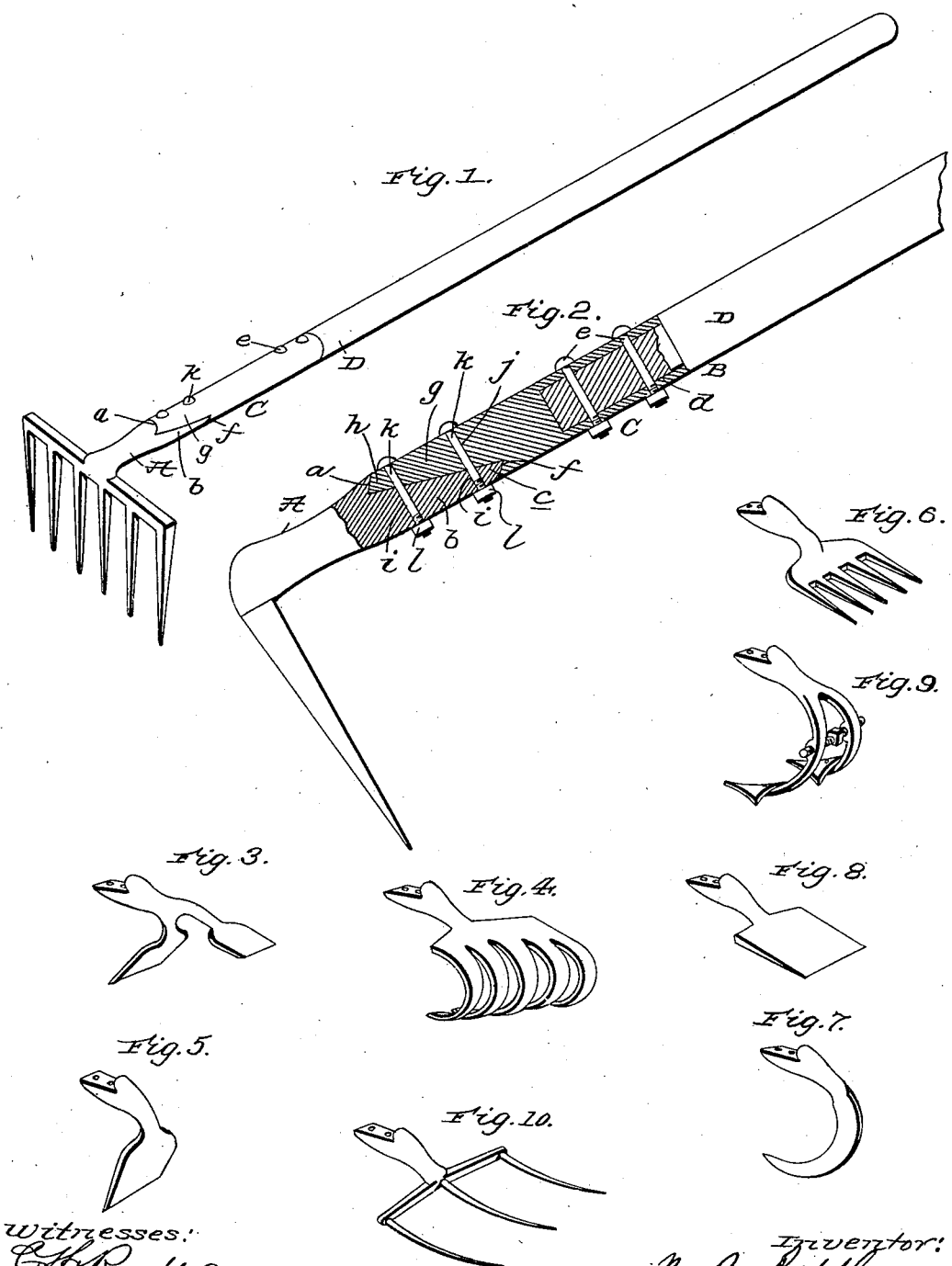

NAPOLEON B. RIDDLE, OF RIDDLE, LOUISIANA.

GARDENING IMPLEMENT.

SPECIFICATION forming part of Letters Patent No. 669,397, dated March 5, 1901.

Application filed September 6, 1900. Serial No. 29,217. (No model.)

*To all whom it may concern:*

Be it known that I, NAPOLEON B. RIDDLE, a citizen of the United States, residing at Riddle, in the parish of West Feliciana and State of Louisiana, have invented new and useful Improvements in Farming or Gardening Implements, of which the following is a specification.

My invention relates to improvements in farming or gardening implements; and it consists in the peculiar and advantageous combination implement hereinafter described, and particularly pointed out in the claim appended, the said implement comprising a handle and tools of various descriptions having shanks constructed with a view of permitting of any one of them being readily connected to the handle and as readily disconnected therefrom when it is desired to employ a tool of another kind.

In the accompanying drawings, Figure 1 is a perspective view illustrating my improved implement as comprising a handle and a rake connected thereto. Fig. 2 is an enlarged view, partly in elevation and partly in longitudinal section, of the same. Fig. 3 is a transplanting and thinning hoe designed to be used in conjunction with the handle in lieu of the rake shown in Figs. 1 and 2. Fig. 4 is a tool substantially in the form of the human hand and designed to be used for cultivating and weeding purposes. Fig. 5 is a perspective view of a weeding-hoe. Fig. 6 is a perspective view of a pronged spade for loosening ground and digging potatoes and the like. Fig. 7 is a perspective view of a brier-hook having an inner cutting edge. Fig. 8 is a perspective view of a spade. Fig. 9 is a perspective view of a double cultivating-shovel, the same having two resilient tangs provided with transverse threaded apertures and a right and left hand threaded screw extending through the correspondingly-threaded apertures of the tangs and provided at an intermediate point of its length with an angular enlargement through the medium of which it may be readily turned to increase or diminish the distance between the tangs and the shovels carried thereby. Fig. 10 is a perspective view of a hay-fork.

In the said drawings similar letters of reference designate corresponding parts in all of the several views.

Each of the tools shown in the drawings comprises a metallic shank A, which is preferably solid, circular in cross-section, and gradually increased in diameter toward its rear end, and is provided at its upper side, adjacent to said end, with an undercut shoulder or abutment $a$, and is also provided with a tongue $b$, which forms a continuation of the lower portion of the shank and is gradually diminished in thickness from the main portion of the shank to its beveled end $c$, as shown, for a purpose presently described.

B is the handle of my improved combination implement. This handle comprises a metallic member C and a helve or wooden member D, both of which are best illustrated in Figs. 1 and 2. The metallic handle member is circular in cross-section and is solid from its forward end to the socket $d$, which is provided in its rear end to receive the helve D, said helve being secured, preferably, in a detachable manner by bolts $e$, as shown. Said metallic handle member is gradually increased in diameter toward its forward end and is provided adjacent to said end and at its under side with an undercut shoulder $f$, adapted to abut against the end $c$ of the shank A, as shown. It is also provided with a tongue $g$, which is gradually diminished in vertical thickness from the main portion to its end $h$, which is beveled, as shown, in order to conform to and abut against the undercut shoulder of the tool-shank.

The tongue $b$ of shank A and the tongue $g$ of the handle member C are provided with apertures $i j$, respectively, the said apertures $i j$ being coincident when the shank A and handle member C are arranged in the relation shown in Fig. 2 and being designed to receive bolts $k$, which are equipped with nuts $l$ and are designed to detachably connect the shank A of the tool to the metallic member of the handle, as illustrated. As will be readily observed by reference to Fig. 2, the straight tool-shank, the metallic handle member, and the wooden handle are arranged in alinement with each other and in the line of thrust, which conduces materially to the strength and durability of the implement.

By virtue of the tongue g being arranged upon the tongue b and the beveled end of said tongue g resting in engagement with the undercut shoulder or abutment of the shank A while the beveled end of the tongue b rests in engagement with the undercut shoulder of the handle member C, it will be seen that the shank A and handle member C virtually form a continuous solid body of metal and that practically all strain is removed from the bolts k incident to the manipulation of the implement. It will also be seen that when it is desired to employ a tool other than the rake as a part of the implement it is simply necessary to remove the bolts k and the shank of the rake from the handle member C and replace the same with the tool desired, the bolts k being susceptible, of course, of use in connecting all of the tools to the handle member C.

It will further be appreciated from the foregoing that my improved combination implement is very simple and inexpensive and that its cost when it comprises the several tools illustrated is very much less than the cost of a number of implements for doing the same work. Moreover, it will be appreciated that the removal of one tool and the replacing of the same by another may be quickly and easily accomplished and this without the employment of skilled labor or any tool other than a common wrench.

I have entered into a specific description of the construction and relative arrangement of the parts of my improved implement in order to impart a full, clear, and exact understanding of the preferred embodiment of the same. I do not desire, however, to be understood as confining myself to such specific construction and arrangement of parts, as such changes or modifications may be made in practice as fairly fall within the scope of my claim.

Having described my invention, what I claim, and desire to secure by Letters Patent, is—

The herein-described farming implement, consisting essentially of a metallic tool having an integral straight shank gradually increased in thickness toward its rear end; the said shank being provided with an undercut shoulder at its upper side, and also provided with a tongue which projects beyond the shoulder, and has an inclined upper side and a beveled end, a straight metallic handle member gradually increased in thickness toward its forward end, and having a socket in its rear end, and also having an undercut shoulder at its under side, and a tongue extended beyond the shoulder and provided with a beveled end and an inclined lower side, transverse bolts extending throughout the thickness of the tongues of the tool-shank and handle member, and detachably connecting the same, and a wooden handle secured in the socket of the handle member; the tool-shank, the metallic handle member and the wooden handle being arranged in alinement with each other and in the line of thrust, as and for the purpose set forth.

In testimony whereof I have hereunto set my hand in presence of two subscribing witnesses.

NAPOLEON B. RIDDLE.

Witnesses:
W. R. B. TURNER,
J. H. CLACK.